US008116527B2

(12) United States Patent
Sabol et al.

(10) Patent No.: US 8,116,527 B2
(45) Date of Patent: Feb. 14, 2012

(54) USING VIDEO-BASED IMAGERY FOR AUTOMATED DETECTION, TRACKING, AND COUNTING OF MOVING OBJECTS, IN PARTICULAR THOSE OBJECTS HAVING IMAGE CHARACTERISTICS SIMILAR TO BACKGROUND

(75) Inventors: Bruce M. Sabol, Vicksburg, MS (US); R. Eddie Melton, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 331 days.

(21) Appl. No.: 12/575,073

(22) Filed: Oct. 7, 2009

(65) Prior Publication Data

US 2011/0081043 A1   Apr. 7, 2011

(51) Int. Cl.
*G06K 9/00* (2006.01)
*G06K 9/38* (2006.01)
*G06K 9/40* (2006.01)
*H04N 7/18* (2006.01)

(52) U.S. Cl. ........... 382/103; 348/61; 382/270; 382/275
(58) Field of Classification Search .......... 382/100–320; 348/61–161, 169–172
See application file for complete search history.

(56) References Cited

U.S. PATENT DOCUMENTS

| | | | | |
|---|---|---|---|---|
| 5,034,986 A * | 7/1991 | Karmann et al. | ............. | 382/103 |
| 5,109,435 A * | 4/1992 | Lo et al. | ............. | 382/103 |
| 5,317,685 A * | 5/1994 | Morimura et al. | ............. | 345/474 |
| 5,706,367 A * | 1/1998 | Kondo | ............. | 382/236 |
| 5,805,742 A * | 9/1998 | Whitsitt | ............. | 382/275 |
| 5,883,969 A * | 3/1999 | Le Gouzouguec et al. | ... | 382/103 |
| 6,275,617 B1 * | 8/2001 | Kondo | ............. | 382/236 |
| 6,298,143 B1 * | 10/2001 | Kikuchi et al. | ............. | 382/103 |
| 6,335,985 B1 * | 1/2002 | Sambonsugi et al. | ......... | 382/190 |
| 6,335,988 B1 * | 1/2002 | Kondo | ............. | 382/236 |
| 6,618,439 B1 * | 9/2003 | Kuo et al. | ............. | 375/240.16 |
| 6,891,570 B2 | 5/2005 | Tantalo et al. | | |
| 6,931,146 B2 | 8/2005 | Aoki et al. | | |
| 7,027,615 B2 * | 4/2006 | Chen | ............. | 382/104 |
| 7,030,905 B2 * | 4/2006 | Carlbom et al. | ............. | 348/157 |

(Continued)

OTHER PUBLICATIONS

Sabol, et al., A Thermal IR Processing Technique for Detecting and Tracking Objects in Motion, InfraMation 2007 Proceedings, May 24, 2007, ITC 121A, 8 pp., Engineer Research & Development Center, USA.

(Continued)

*Primary Examiner* — Manav Seth
(74) *Attorney, Agent, or Firm* — Earl H. Baugher, Jr.

(57) ABSTRACT

A system and method to automatically detect, track and count individual moving objects in a high density group without regard to background content, embodiments performing better than a trained human observer. Select embodiments employ thermal videography to detect and track even those moving objects having thermal signatures that are similar to a complex stationary background pattern. The method allows tracking an object that need not be identified every frame of the video, that may change polarity in the imagery with respect to background, e.g., switching from relatively light to dark or relatively hot to cold and vice versa, or both. The methodology further provides a permanent record of an "episode" of objects in motion, permitting reprocessing with different parameters any number of times. Post-processing of the recorded tracks allows easy enumeration of the number of objects tracked with the FOV of the imager.

20 Claims, 3 Drawing Sheets

U.S. PATENT DOCUMENTS

| | | |
|---|---|---|
| 7,035,434 B2 | 4/2006 | Estevez |
| 7,302,004 B2 | 11/2007 | Zhang et al. |
| 7,327,855 B1 * | 2/2008 | Chen .............................. 382/104 |
| 7,430,304 B2 | 9/2008 | Kikuchi |
| 7,460,689 B1 | 12/2008 | Chan |
| 7,817,833 B2 * | 10/2010 | Ramsay et al. ................ 382/128 |
| 7,860,311 B2 * | 12/2010 | Chen et al. ..................... 382/173 |
| 8,031,906 B2 * | 10/2011 | Fujimura et al. .............. 382/103 |
| 2003/0142210 A1 * | 7/2003 | Carlbom et al. ............... 348/157 |
| 2006/0269161 A1 * | 11/2006 | Ramsay et al. ................ 382/276 |
| 2008/0159626 A1 * | 7/2008 | Ramsay et al. ................ 382/190 |

OTHER PUBLICATIONS

Walton, et al., 4DCAPTURE(tm)/4DPLAYER(tm): Evolving Software Packages for Capturing, Analyzing and Displaying Two- and Three-Dimensional Motion Data, 27th International Congress on High-Speed Photography and Photonics, 2007, vol. 6279, 13 pp., Proc. of SPIE, USA.

Sabol, et al., Poor Man's Missile Tracking Technology: Thermal IR Detection and Tracking of Bats in Flight, 2005, vol. 5811:24-33, 20 pp., Proc. of SPIE, USA.

* cited by examiner

USING VIDEO-BASED IMAGERY FOR AUTOMATED DETECTION, TRACKING, AND COUNTING OF MOVING OBJECTS, IN PARTICULAR THOSE OBJECTS HAVING IMAGE CHARACTERISTICS SIMILAR TO BACKGROUND

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Bea Shahin at 217 373-7234.

BACKGROUND

A challenge for enumerating numbers of objects is the detection and tracking, and subsequent counting of free flying bats emerging from their roost. Thermal infrared imagers have shown broad potential for finding warm blooded animals and locating their habitats under a wide range of conditions. Boonstra, R., et al., *Finding Mammals Using Far-Infrared Thermal Imaging*, Journal of Mammalogy, 75(4): 1063-1068, 1994. Gamer, D. L., et al., *Use of Modern Infrared Thermography for Wildlife Population Surveys*, Environmental Management, 19(2):233-238, 1995. Havens, K. J. and E. J. Sharp, *Using Thermal Imagery in the Aerial Survey of Animals*, Wildlife Society Bulletin, 26(1):17-23, 1998. Generally, imagery for these applications has been obtained from airborne platforms. Detection of candidate wildlife typically involves extracting a warm candidate from a thermally variable cluttered background. Techniques typically involve thresholding to segment out candidate areas, followed by shape and size feature analysis of candidate areas within single frames of imagery.

A large emergence of bats is typically a wildly chaotic process. The flight path is neither uniform nor unidirectional and the bats may be observed against all nature of background clutter. A technique is needed which can detect bats against realistic background clutter and does not require any assumptions on flight behavior of the bats.

Conventional image processing-based enumeration techniques have serious limitations when applied to the reality of a large emergence. Enumeration of bats emerging from a large roost of colonial bats is a particularly challenging and an ecologically useful undertaking—given the complexity and chaos of the bat flow, and the lack of reliable and accurate alternative enumeration methods. Kirkwood and Cartwright first showed the utility of stationary ground-based thermal infrared videography for the detection of bats in flight and in roosts. Kirkwood, J. J., and A. Cartwright, *Behavioral Observations in Thermal Imaging of the Big Brown Bat, Eptesicus fuscus*, Proceedings of the International Society for Optical Engineering, vol. 1467, Thermosense XIII:369-371, 1991.

Sabol and Hudson showed the feasibility of a semi-automated digital image processing procedure for enumerating bats in a large cave emergence using un-calibrated thermal infrared video imagery. Sabol, B. M., and M. K. Hudson, *Technique Using Thermal Infrared-Imaging for Estimating Populations of Gray Bats*, Journal of Mammalogy 76(4): 1242-1248, 1995. They automated detection and enumeration of bats in periodically sampled frames. Image enhancement, using frame differencing, was performed prior to detection, resulting in the virtual elimination of false alarms from stationary background clutter. Flow rate (bats/minute) was then computed by applying an independent estimate of bat velocity in the image plane. Resulting counts were within a few percent of independent visual counts simultaneously made by a trained wildlife biologist.

Frank et al. used an approach similar to Sabol and Hudson (1995), employing all frames in the video stream to enumerate bats emerging from caves in central Texas. Frank, J. D. et al., *Advanced Infrared Detection and Image Processing for Automated Bat Censusing*, Proceedings of the International Society of Optical Engineering, vol. 5074, Infrared Technology and Applications XXIX:261-271, 2003. Frank et al. reduced background clutter by erecting a large thermally homogeneous background screen against which the bats are easily detected. This method required the assumption of a uniform unidirectional bat flight and estimates of that velocity.

A single polarity approach is used when all the candidate objects imaged have an observable constant polarity, i.e., objects are predictably and consistently different from their immediate background, not changing from frame to frame or over the duration of a capture event (episode). The single polarity approach to pixel detection is described in a paper presented to the International Optical Society. (SPIE Proceedings vol. 5811:24-33, March 2005). Subsequent use of this technique for counting bats exposed the limitations of the single polarity approach.

Melton et al. developed a technique to detect bats against realistic background clutter that does not require any assumptions on the flight behavior of the bats. Melton, R. E. et al., *Poor Man's Missile Tracking Technology: Thermal IR Detection and Tracking of Bats in Flight*, Proceedings of the International Society of Optical Engineering (SPIE), vol. 5811: 24-33, 2005. This process iterates frame by frame resulting in the ability to track individual bats from the time they first appear until they are lost from the field of view. Sequential frames are differenced to remove stationary clutter, and thresholded to select pixels outside of the central distribution of differenced pixel values (both positive and negative). This technique has proven successful, within 2% when compared with manual counts, but only when the polarity of the tracked objects remains constant.

The Melton et al. technique requires that the bat exhibit a "hot polarity," i.e., that it be warmer than its immediately surrounding background. While this is commonly the case, there are notable exceptions, such as imaging bats against natural terrain (rocks, trees, etc.) near sunset. Under these conditions a bat emerging from a cool cave may temporarily exhibit a neutral or even a "cold polarity" when it flies in front of a background object recently heated by the sun. The resulting polarity swap causes the tracking algorithm of Melton et al. to lose track of the flight path. In select embodiments of the present invention, a new technique extracts target signatures from a video stream able to track objects exhibiting polarity ambiguities, including changes, while providing automated detection, tracking, and enumeration of many closely spaced objects in motion, such as bats in free flight.

DETAILED DESCRIPTION

Select embodiments of the present invention provide the ability to automatically detect, track and count moving objects at a higher density than can be performed by a trained human observer. Select embodiments of the present invention detect and track objects having thermal signatures similar to a complex stationary background pattern as they move in relation to the background. That is, using select embodiments of the present invention allows tracking an object that need not be detected every frame, that changes polarity in the imagery (switching from relatively light to dark or relatively hot to cold and vise versa), or both. The methodology of select embodiments of the present invention provides a permanent record of an "episode" of objects in motion, such as bats emerging from a cave at dusk, permitting reprocessing with different parameters any number of times.

Select embodiments of the present invention detect objects in motion against complex backgrounds; detect objects in motion that may be obscured in some frames; detect objects in motion that exhibit polarity changes; count the net flow of objects in motion that exhibit a complex or circuitous path; and have the ability to generate an image of background only from a segment of video thermal imagery containing objects in motion in complex background by employing a "temporal filtering" procedure.

Figure 1:
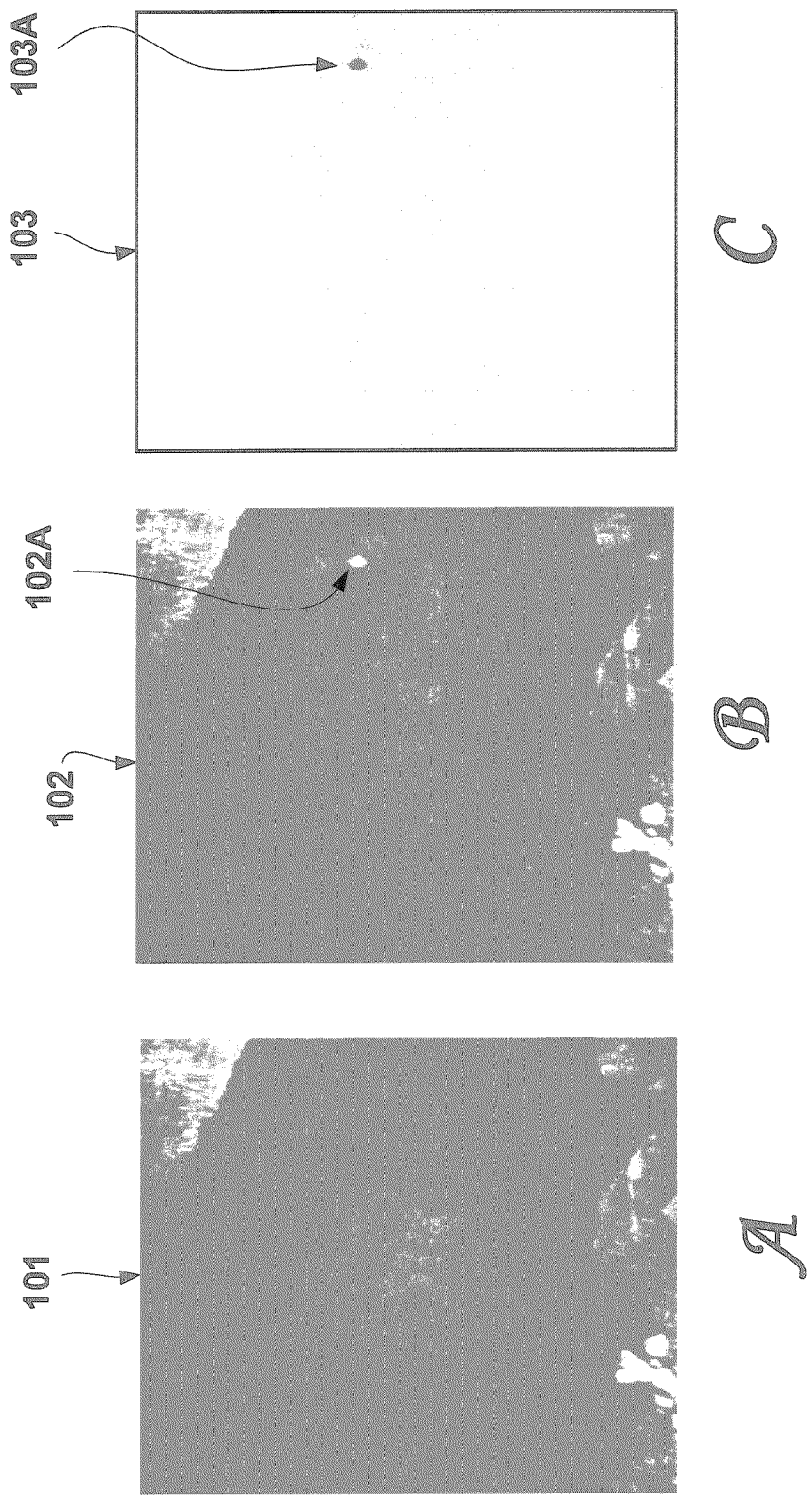
FIG. 1A illustrates a temporal background presented as a thermographic image as may be employed in select embodiments of the present invention.
FIG. 1B combines the temporal background of FIG. 1A with that of a single target as may be employed in select embodiments of the present invention.
FIG. 1C is a "differenced" frame, subtracting the background of FIG. 1A from that of FIG. 1B to leave only a "pixel cluster" representing the target alone as may be employed in select embodiments of the present invention.

Select embodiments of the present invention detect, track and count moving objects digitally captured with video-based thermal (IR) imagery. A camera with IR lens is fixed in orientation to record a period (episode) of objects moving against a background. The recorded data are output as a file of individual objects tracked frame-by-frame over time. Using an additional post-processing program, the net flow of objects in a user-specified direction can be computed. Results of employing basic steps of select embodiments of the present invention are illustrated in FIG. 1 and described below.

In select embodiments of the present invention, a digital thermal videographic camera capable of distinguishing a candidate object (target) against background is fixed in position and orientation. Select embodiments of the present invention orient the camera such that candidate objects move in a direction approximately perpendicular to the line of sight of the camera. Preferably, the candidate objects are viewed against a background that yields a high candidate object-to-background contrast. Additionally, the combination of factors that determine for how many frames the object is within the camera's field of view (FOV) should be such that any moving object to be tracked should be imaged for six or more consecutive frames. These factors include object velocity, camera field of view, distance to object, and camera rate (frames per second). In select embodiments of the present invention imaging may be recorded on digital media to capture an entire episode of candidate objects in motion, or a sample thereof.

Two detection approaches are available within select embodiments of the present invention. In a first, a Polarity Independent Approach is used in the general case when there is at least some contrast between a candidate object and its immediate background, but the amount of contrast may change between objects or from frame to frame for a single object.

For select embodiments of the present invention employing a Single Polarity approach, sequential frames of digital imagery are differenced, i.e., the previous frame is subtracted from the current frame. This step eliminates all stationary clutter resulting in a "difference frame" containing only noise and scene features differing measurably from frame to frame, i.e., features that relate to moving candidate objects. By employing user-specified thresholds, the location and value of difference pixels whose values exceed the threshold (as defined) are saved to a "detected pixel" report for subsequent processing.

For those embodiments of the present invention employing the Polarity Independent Approach, a synthetic target-free background image, created by a temporal filtering process described below, is subtracted from each sequential frame. The absolute value of the difference image is taken to eliminate the effects of polarity. The location and value of difference pixels meeting a user-specified threshold are saved to a detected pixel report for subsequent processing. Synthetic target-free background images are generated at a time interval and number of sequential source images specified by a user. The value for each pixel in this synthetic target-free image is determined by taking the mode of the histogram of pixel values for each location within a source image.

In select embodiments of the present invention, a detected pixel report is processed to assign individual pixels to individual detected candidate objects, each candidate object possibly comprising many pixels (pixel cluster). A standard "region growing" technique is applied to find discrete contiguous pixel clusters to be associated with a particular candidate object. Center location, number of pixels, and boundary dimensions are saved for subsequent processing.

In select embodiments of the present invention, a method for tracking bats employs one or more specially configured computers incorporating computer readable storage media containing specialized software implementing one or more algorithms. The method captures video images of the bats by employing one or more digital imaging devices, such as video cameras operating in the infrared (IR) spectrum. The method has the imaging devices communicate with one or more specially configured computers. The computers employ the specialized software to implementing first algorithms to create one or more synthetic adaptive temporal background within the field of view (FOV) of the digital imaging devices, the synthetic adaptive temporal background removing clutter and establishing a "target free" background for further use in an established time frame for monitoring an event or episode having a limited time period of occurrence. The method establishes the synthetic temporal target-free backgrounds (images) at a time interval and number of sequential source images specified by a user. Further, the method determines a value for each pixel in the synthetic target-free background by taking the mode of a histogram of values of the pixels for each location within a video image. The method provides for collecting on the computer readable storage media the video images of the bats as pixels arranged in video frames. The method provides for sending the video images of the bats to the computer for processing using specialized software. The method further provides that for each bat imaged by a digital imaging device, differencing the pixels in the video frames sequentially by subtracting a current synthetic temporal background to yield differenced pixels as a differenced image and taking the absolute value of each resultant differenced image. The absolute value eliminates the effects of polarity. The method further provides for thresholding, to a user-specified threshold, those of the differenced pixels at the tail end of the distribution of the differenced pixels and saving the location and value of the thresholded differenced pixels to a detected pixel report for subsequent processing. The method thus permits identification of imaged bats as an individual pixel cluster in a video frame of thresholded differenced pixels, such that a track of an imaged bat is established if two individual pixel clusters representing an individual bat exhibit similar size in two successive video frames of differenced thresholded pixels. The method further applies a standard "region growing" technique to find discrete contiguous pixel clusters to be associated with each candidate bat, such that applying the "region growing" algorithm establishes a cluster of contiguous single-polarity pixels that identifies an individual bat. The method also saves characteristics such as the center location of a pixel cluster, the number of pixels in the cluster, and boundary dimensions of the pixel cluster for subsequent processing. The method determines the center location [X,Y] of each pixel cluster by taking an average of all locations of the pixels within a pixel cluster weighted by a respective absolute difference value. The method further establishes two pixel clusters of a similar size in successive video frames as location pairs, and updates and labels each location pair as a motion vector in each subsequent differenced thresholded video frame, using the updating to predict a next position of each imaged bat. The method iterates video frame-by-video frame for each FOV established by the imaging device and respective synthetic temporal background to generate an output of individual tracks of each imaged bat, thus enabling simultaneous tracking of multiple bats in an episode such as an emergence from a cave. Further, the method enables tracking even when bats may have a thermal signature in a range that is approximately equal to the range of the thermal signature of a stationary background in the FOV of the digital imaging device and behavior of multiple bats may be chaotic during the episode.

In select embodiments of the present invention, the method further enumerates a list of tracks of individual bat flights as either on an emergent list or on a return list. The method specifies a polygon within a FOV of an imaging device; classifies each track that originates on the inside of the polygon and terminates on the outside of the polygon as an emergent track; increments by one an emergent list for each track classified as an emergent track; classifies each track that originates on the outside of the polygon and terminates on the inside of the polygon as a return track, and increments by one the return list for each track classified as a return track. The method further labels any objects remaining as unclassified.

In select embodiments of the present invention the method differences the emergent list and return list to yield a net flow count.

In select embodiments of the present invention, a tracking algorithm establishes four lists: a Pixel Cluster List loaded for each selected video frame; a Potential List; a Tracking List; and a Target List. Further, when the method identifies a pixel cluster to a specific candidate bat, that pixel cluster is removed from the Pixel Cluster List. In addition to the above lists, the method implements four processes: Tracking Current Targets, predicting a search location and radius using a computed motion vector to select a candidate bat in the current video frame that best fits user-specified search criteria, and matching pixel clusters for all candidate bats on the Tracking Current Targets List; Identifying New Targets, searching for new bats to track using a search radius based on size; Identifying New Potential Targets, clearing unmatched bats from the Potential List, creating new candidate objects for each pixel cluster remaining in the Pixel Cluster List and placing all unmatched bats in the current video frame on a potential list for input into a next process for a next video frame, and adding candidate bats to the Potential List; and Identifying Completed Tracks, that accepts an input from the Potential List, and identifies any bats on the Tracking List that have not had any recent track updates and, based on processing rules, discards bats without recent track updates or moves bats without recent track updates to the Target List, such that the tracking algorithm processes detected bats across the video frames, producing a time and spatial history for each.

In select embodiments of the present invention the method further computes attributes associated with each bat identified to a pixel cluster, attributes such as frame number, time, clock time, number of pixels in the pixel cluster, height and width (in pixels) of each pixel cluster, and combinations thereof, passing them to the tracking algorithm for each identified pixel cluster in each differenced video frame.

In select embodiments of the present invention, the method further calculates a motion vector for each track by differencing a last two known positions of a bat, adjusting the motion vector for the number of video frames, n, since a previous detection of the bat and the number of frames, m, since a most recent detection of the bat, computes a search radius by multiplying the magnitude of the motion vector by a user-specified constant, K; predicts a new position for each current track by computing a predicted position, such that the predicted position is computed to be where the current track would extend without any deviation in the motion vector associated therewith, and such that K is a maneuverability factor representing the ability of a candidate bat in motion to change speed and direction and is selected to accommodate deviations in the motion vector, and the predicted position is computed using a current location and the computed motion vector. The method computes the predicted position by summing current coordinates and vector increments, and sets a radius to the maximum of either the computed product or a minimum allowed radius, a minimum radius accommodating bats that are at the outer range limit of detection and are moving at a rate slower than expected for these bats. The method uses the predicted location, and the tracking radius while cycling through the Pixel Cluster List of a current video frame and calculating a distance between the predicted position and a center position of each pixel cluster in the current video frame, such that if the distance is within the computed search radius, a difference in pixel counts for each bat in the current video frame is calculated for comparison, and if multiple bats, each identified as one of the pixel clusters, are found within the search radius, a search radius that is closest to the predicted location and closest in size to an individual tracked pixel cluster is selected as a best fit. Further, if a valid candidate pixel cluster is found, that candidate pixel cluster is represented as a bat and is added to tracking information on that bat; and matches are located to the tracked bat on a current Potential List. T For each potential item on the Potential List the method further employs an algorithm to search through the Pixel Cluster List for the current video frame to locate a pixel cluster that best matches the location and size of the tracked bat, given that the pixel cluster representing the next location for the tracked bat is within a second radius of δ, an estimate of the maximum distance that the tracked bat is expected to travel based on its size, $N_P$, an estimated cross-sectional area, A (m²), a video frame rate, F (Hz), an estimated maximum speed $S_m$ (m/s), and the solid angle, $\Omega$ (steradians), of the pixel represented by:

$$\delta = \frac{\tan^{-1}\left(\frac{\frac{1}{F}*S_m}{\sqrt{\frac{A}{2*N_P*\Omega}}}\right)}{\sqrt{\Omega}} \quad (1)$$

Using the location of a potential (candidate) bat an algorithm searches through the pixel clusters on the Pixel Cluster List of the current video frame, calculating the distance between locations and the difference in pixel counts, such that if multiple candidate bats are found within the search radius, $\delta$, the candidate bat that is closest to the predicted location and closest in size to the pixel cluster from a selected preceding video frame is selected as a best fit. If the pixel cluster is found within the search radius, $\delta$, a new pixel cluster is added to the tracking information for a potential bat and moved to the Tracking List; transferring the remaining pixel clusters to the Potential List and removing pixel clusters that are currently on the Potential List before the remaining pixel clusters are added, potential bats being viewed only for a single video frame cycle, and if a match for a pixel cluster is not found, the un-matched pixel cluster remains unclassified. Further, to minimize false tracks, the pixel cluster must exceed a user-specified minimum size, adding pixel clusters that exceed the user-specified minimum size to the Potential List for the current video frame. The method further identifies objects on the Tracking List that have not had any recent track updates, a user specifying a number of consecutive video frames that may elapse without an update to the track such that when a specified number of consecutive video frames is reached a track is considered lost; removing the lost track from the Tracking List and either discarding the lost track or adding the lost track to the Target List. The method also specifies a minimum length of the track that must be reached for the bat to be accepted for the Target List; adding the track to the Target List once the track is accepted either as a continuation of a previous track or as a new track. The method further classifies the accepted track as the continuation of a previous track if the track had been obscured by a configuration in the FOV of a digital imaging device; establishes user-specified criteria for concatenation and verifies the classification as the continuation of a previous track by insuring terminal points of existing tracked bats in a preceding said video frame meet user-specified criteria for concatenation. The method performs a final verification check after all video frames in a video sequence have been processed through the algorithm; and specifies a minimum travel distance, d, that each tracked bat must traverse to be considered valid and also computes a smallest enclosing rectangle for the track of the bat, computing the hypotenuse of the smallest enclosing rectangle, and comparing the hypotenuse with the minimum travel distance, d. Further, the method computes the pixel solid angle, $\Omega$, from horizontal and vertical FOVs ($h_{FOV}$ and $v_{FOV}$, in degrees) and number of said pixels within the FOV ($h_{Pixels}$ and $v_{Pixels}$), by implementing:

$$\Omega = \left(\frac{hFOV*\frac{\pi}{180}}{hPixels}\right)*\left(\frac{vFOV*\frac{\pi}{180}}{vPixels}\right) \quad (2)$$

The criteria for implementing the method comprise: the terminal point of a track cannot terminate at the edge of the preceding video frame; the first time of appearance in a successive video frame of a new track must occur within a reasonable time after that of the terminal point of a track; and coordinates of a new track must lie within a user-specified distance and angle, $\beta$, from the terminal point of a track, such that if any of the criteria are not met, the track is added as a new track on the Target List.

In select embodiments of the present invention, the method further comprises fixing in position and orientation one or more digital video imaging devices as one or more digital thermal videographic cameras, orienting the digital thermal videographic camera such that candidate bats move in a direction approximately perpendicular to the line of sight of the digital thermal videographic camera.

In select embodiments of the present invention, the method considers a combination of factors, to include at least the velocity of a candidate object, camera FOV, distance to the candidate object, and a frame rate that determines for how many video frames each candidate object is within the FOV of the camera to permit imaging of a candidate bat for at least six consecutive frames.

In select embodiments of the present invention the above described method may be applied to capture images of various objects in motion to enable simultaneous tracking of multiple objects in motion, the objects in motion having at least one characteristic of their signature in a range that is, at some times, approximately equal to the range of the characteristic in the signature of a background behind the objects in motion.

In select embodiments of the present invention, a system enables simultaneous tracking of multiple objects in motion, candidate objects in motion having at least one characteristic of their signature in a range that is approximately equal to the range of a characteristic in the signature of an established temporal background behind the objects in motion. The system may comprise: one or more tripods; computer readable memory storage media containing specialized software implementing specially adapted algorithms; a specially configured computer in operable communication with the computer readable memory storage media; one or more digital imaging devices, such as a digital video camera that may operate in the IR spectrum, each imaging device preferably affixed to a tripod for capturing images of multiple objects in motion within a pre-specified FOV against a fixed temporal background, the images to be sent to the computer readable memory storage media accessible by a specially configured computer and processed as video frames consisting of pixels that may be arranged as pixel clusters that represent individual objects in motion. The specially configured computer processes the captured images by employing algorithms, a first algorithm applied so that for each candidate object in motion, the pixels are differenced in the video frames sequentially by subtracting an adaptive temporal background, the subtraction at least removing clutter from the differenced frame, a second algorithm further enabling thresholding to remove those pixels at the tail ends of the distribution of differenced pixels, resulting in candidate objects in motion appearing as the only pixel clusters in the thresholded differenced video frame, and further establishing a track of one candidate object in motion if two pixel clusters exhibit similar size in a successive frame processed after the initial differenced thresholded video frame, and such that two pixel clusters of a similar size are then referred to as location pairs defining a motion vector that is updated in each subsequent differenced thresholded video frame to predict a next position of a candidate object in motion, and each algorithm is iterated for successive video frames to generate an output of individual tracks of each candidate object in motion that is represented in the differenced thresholded video frames. Further, the system enables enumeration of the objects in motion by classifying that object in motion that originates on the inside of a pre-specified polygon and terminates on the outside of the polygon as an emergent track and incrementing an emergence tally by one for each so identified candidate object in motion, and classifying that object in motion that originates on the outside of a pre-specified polygon and terminates on the inside of the polygon as a return track and incrementing a return tally by one for each so identified candidate object in motion, and considering all other candidate objects in motion as unclassified.

Figure 3:
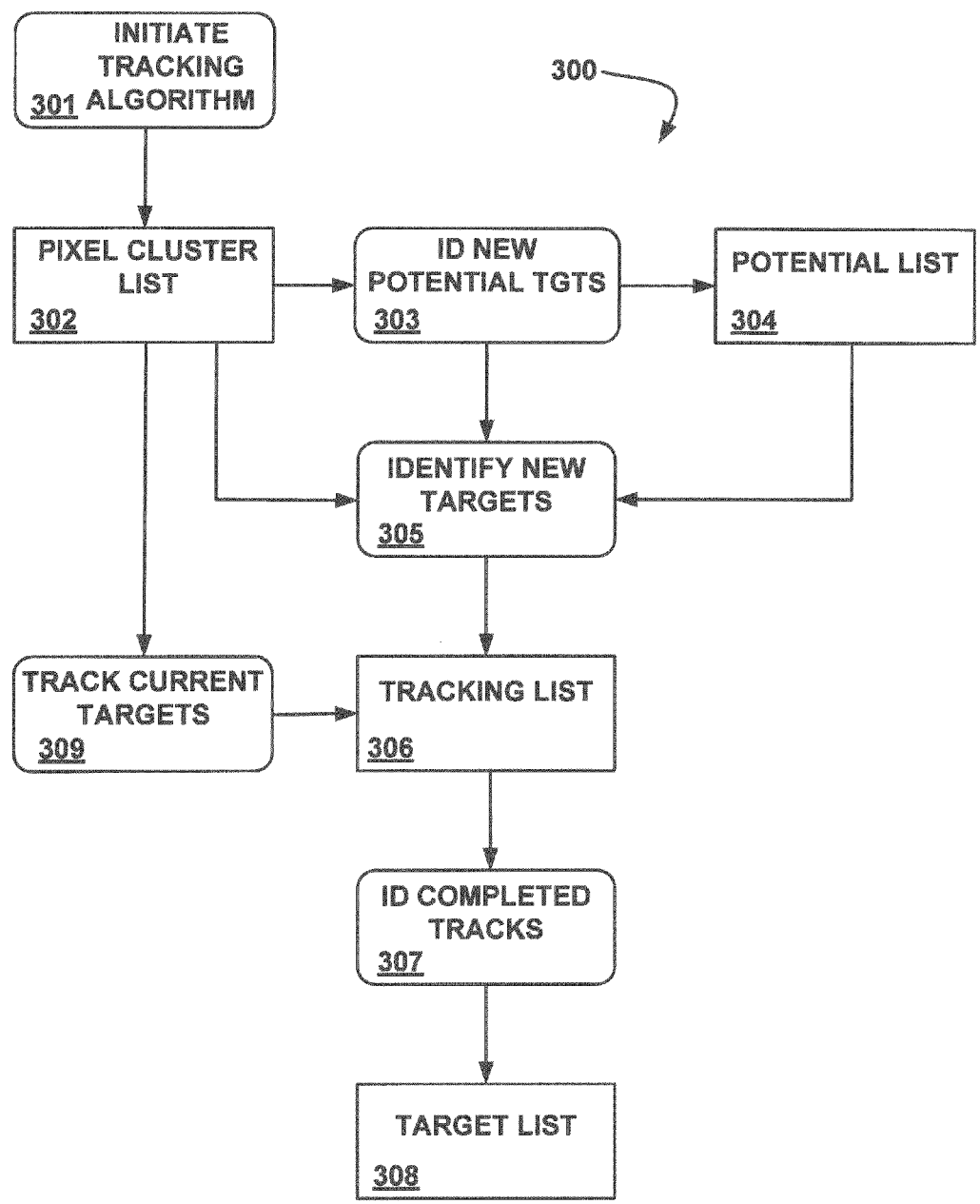
FIG. 3 depicts a processing flow for a tracking algorithm used with select embodiments of the present invention.

Refer to FIG. 3. In select embodiments of the present invention, a Tracking Algorithm 301 processes detected candidate objects in motion across video frames producing a time and spatial history for each. In select embodiments of the present invention, the algorithm consists of four processes (Identify New Potential Targets 303, Identify New Targets 305, ID Completed Tracks 307, and Track Current Targets 309). These processes represent the decision logic that transforms candidate objects in motion to tracked targets. In select embodiments of the present invention the Track Current Targets 309 process predicts a search location and radius using a computed motion vector to select a candidate object in the current frame that best fits user-specified search criteria. In select embodiments of the present invention, once currently tracked candidate objects are accounted for, the Identify New Targets 305 process searches for new objects to track using a search radius based on size. In select embodiments of the present invention, a single polarity approach uses both negative (e.g., cold) and positive (e.g., hot) polarity candidate objects in motion in a search for a match in a "current" frame. In select embodiments of the present invention, the "polarity-independent" approach uses identified candidate objects in motion from the previous frame to search for a match. When an identified candidate object in motion from a current frame is matched to one of a predecessor frame, the pair signifies a tracked candidate object in motion (target). In select embodiments of the present invention, the Identify New Potential Targets 303 process places all of the unselected objects in the current frame on a potential list for input into the Identify New Targets 305 process for the next frame. Finally, in select embodiments of the present invention, the ID Completed Tracks 307 process identifies any tracked candidate object on the Tracking List 306 that has not had any recent track updates and, based on processing rules, discards them or moves them to the completed track list (Target List 308).

In select embodiments of the present invention, post-processing counting rules are applied to the tracked output (Target List 308) to determine the net flow of candidate objects in motion, such as bats exiting a cave at dusk. In select embodiments of the present invention, the scene imaged (e.g., cave entrance) is segmented into two regions: Inside and Outside. One or more polygons are interactively drawn to identify the Inside polygon(s). All other areas of the scene are assumed to represent Outside. The first and last location of each individual candidate object in motion is examined. If the object is first detected on the Inside and last detected on the Outside, then the counter is incremented by one, e.g., for an episode indicating the bats are exiting the cave. If the candidate object in motion is first detected on the Outside and last detected on the Inside then the counter is reduced by one, e.g., for an episode indicating the bats are exiting the cave. Any other state (e.g., bat hovering in the FOV of the imager at the cave entrance) does not change the counter. The resulting sum represents the net number of objects moving in the specified direction through the FOV over the observed time period.

Select embodiments of the present invention may be employed to conduct a census of wildlife in motion; for tracking inert objects floating or suspended in a flowing field of fluid; for tracking and counting vehicular or pedestrian traffic; for tracking and counting aircraft in motion, and the like.

In testing select embodiments of the present invention, un-calibrated video-rate thermal imagery from an FPA microbolometric IR imager (digital IR camera) was captured on 8-bit digital media. Frames were then differenced with an adaptive temporal background to remove stationary clutter, and thresholded to select only pixels at the tail ends of the statistical distribution of differenced pixels. Candidate objects in motion then appear as pixel clusters in the image frame. If similar-sized pixel clusters from successive first and second frames are found within a selectable error tolerance, then a new track is established. The location pairs (pixel clusters) define a motion vector that is updated every frame thereafter. They are also used to predict a next position. This process is iterated frame-by-frame, generating an output file of tracks of individual candidate objects in motion. An example is illustrated using bats emerging from a roost site.

In select embodiments of the present invention, thermal infrared video imagery is collected using a stationary source such as a tripod mounted digital video camera operating in the IR spectrum. For an emergence count of bats, it is preferable to set up one or more such cameras to achieve an imaging geometry allowing bats to fly approximately perpendicular to the line of sight of the camera (imager) at a fixed (relatively constant) distance from the camera and against some stationary, cool (as compared to the body temperature of the bats), and thermally homogeneous background. This is rarely achievable, but the algorithm used with select embodiments of the present invention is sufficiently robust to accommodate departure from ideal conditions. Thermal imagery is digitally recorded and in select embodiments of the present invention transferred to a suitable processor, such as a personal computer (PC).

In select embodiments of the present invention frames of the thermal imagery are differenced to eliminate background (clutter) that is stationary or relatively stationary (such as tree limbs moving in the wind). The frames are differenced with a temporal background that represents a "target free" image, e.g., for bats as candidate objects, the outside of the cave entrance just prior to a dusk exit of the bats would serve as an appropriate temporal background for tracking bats using select embodiments of the present invention. For an episode such as bats exiting a cave at dusk, a single temporal background may be appropriate since all of the bats exit within a short time frame on the order of minutes. For other scenarios, two or more temporal backgrounds may have to be computed. Taking the absolute value of the differenced image allows polarity to be disregarded. Only those pixels outside a user-selected threshold that essentially eliminates the temporal background are saved, resulting in significant data compression. By applying a "region growing" algorithm, a cluster of contiguous single-polarity pixels identifies an individual bat. The location and size (number of pixels) of each cluster are saved and passed to a tracking algorithm. The tracking algorithm pairs the location of an individual bat in the current frame to the location of that same bat in the previous frame to compute the motion vector of that bat. The motion vector is used to predict the location of that bat in the next frame. This process iterates frame by frame resulting in the ability to track, and subsequently enumerate individual bats from the time they first appear in the FOV of the camera until they are lost from the FOV.

In select embodiments of the present invention, further processing yields enumeration, e.g., emergence count surveys of bats. This processing segments the image into at least one Inside and at least one Outside polygons and establishes simple rules for determining which polygon a target, such as a bat, was in when first acquired in the FOV and when lost from the FOV.

In select embodiments of the present invention, temporal filtering generates a target-free background image from a sequence of consecutive frames containing moving targets. Temporal filtering may be applied even in a dense target environment, such as a bat emergence, because a given pixel location will contain only background most of the time. This is exploited by generating a histogram of values for each pixel location for a user-selected number of consecutive frames. The modal value of each pixel location is extracted and written to the new temporal-filtered background image. The temporal-filtered target-free background image is subtracted from each frame of captured video imagery, as illustrated in FIG. 1 in which a histogram stretch was applied to the image for display.

In FIG. 1A, the temporal background 101, generated with five frames (n=5), outside a bat cave is presented as a thermographic image. In FIG. 1B, the combined background 102, displaying a single bat 102A, is shown in the video frame of the thermographic image following the five frames used in generating the temporal background. In FIG. 1C, the "differenced" frame (image) 103 is shown, subtracting (differencing) the background of FIG. 1A from that of FIG. 1B to leave the "pixel cluster" 103A representing the bat in the differenced frame 103. This differencing eliminates stationary background clutter by remapping "brightness" values of stationary objects to near zero while enhancing moving objects. Taking the absolute value of the resulting differenced image disregards polarity, thus enabling the display of only moving targets in a differenced frame.

Figure 2:
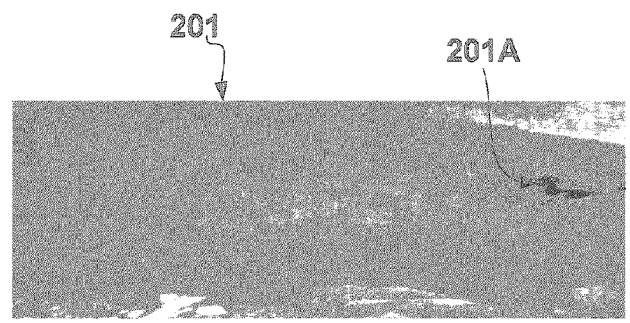
FIG. 2 shows the result of thresholding the differenced image and displaying the results on the original background frame as may be employed in select embodiments of the present invention.

Refer to FIG. 2, depicting the result 201 of thresholding the differenced image and displaying the results on the original frame. In select embodiments of the present invention, an interactive graphic display of the raw and thresholded image is provided. This allows a user to see the effect of selecting different threshold levels before the thresholded frames are saved. In select embodiments of the present invention, a detection threshold is specified by the user and only pixels exceeding the threshold are passed forward as pixel clusters 103A, 201A to the tracking algorithm. The threshold value is chosen to eliminate all or almost all background. Beyond this, the amount of detail available to describe the target is the primary consideration. For bats imaged from a considerable distance, e.g., several hundred yards, it is desirable to set the threshold low to achieve as many pixels on target as possible, while still remaining above background noise. For bats imaged at a close range, e.g., less than 50-100 yards, it is preferable to set a high threshold so that only the body of the bat, and not its wings, are evident in the resultant image represented by the pixel clusters 103A, 201A. This enables differentiation among bats flying in close formation, such as at the entrance to a cave during emergence of the colony from the cave.

In select embodiments of the present invention, clusters 103A, 201A of unassociated pixels are grouped into discrete contiguous candidate areas within the tracking algorithm. A region growing algorithm identifies all pixels within a contiguous single cluster. The center location [X, Y] of each cluster is determined by taking an average of all pixel locations within the cluster weighted by the respective absolute difference value. In select embodiments of the present invention employing thermographic images, this pulls the center closer to the most thermally anomalous part of the cluster. In select embodiments of the present invention, other attributes, beyond center location, are computed and associated with each respective identified cluster. These attributes may include the frame number and time, clock time, number of pixels in the cluster, height and width (pixels) of the cluster, and the like. This set of attributes is passed forward to the tracking algorithm for each identified cluster in each differenced frame.

Refer to FIG. 3 depicting a processing flow 300 started by Initiating a Tracking Algorithm 301 used with select embodiments of the present invention. In select embodiments of the present invention, the Tracking Algorithm processes detected pixel clusters 103A, 201A for each video frame to identify "actual" candidate objects in motion (targets) and to track these, often for purposes of enumeration such as counting bats emerging from a roost at dusk. The Tracking Algorithm consists of four processes 303, 305, 307, 308 and four lists 302, 304, 306, 308. The four processes representing the decision logic (odd numbered boxes) in the Tracking Algorithm are Identify New Potential Targets 303, Identify New Targets 305, Identify Completed Tracks 307, and Track Current Targets 309. They control the transformation of pixel clusters 103A, 201A in an individual differenced frame 103 to the track locations that make up a validated target track. The four lists 302, 304, 306, 308 represent the stages that the pixel clusters 103A, 201A and target objects 102A progress through to be classified as a valid target. The lists are the Pixel Cluster List 302, Potential List 304, Tracking List 306, and the Target List 308.

The Pixel Cluster List 302 contains attributes from each pixel cluster 103A, 201A identified in the Tracking Algorithm for one video frame at any given time. In select embodiments of the present invention, the first step is to Identify New Potential Targets 303 in the first video frame. The Identify New Potential Targets 303 process creates new candidate objects in motion (targets) for each pixel cluster 102A, 103A in the Pixel Cluster List 302 and adds the candidate object in motion to the Potential List 304. When the candidate object in motion is created, the pixel cluster 103A, 201A is added to the tracking information for it. The Potential List 304 is then matched with detected pixel clusters 103A, 201A in a successive video frame.

In select embodiments of the present invention, next the Pixel Cluster List 302 for the successive (second) video frame is loaded. The Identify New Targets process 305 attempts to match the candidate objects on the Potential List 304 with detected pixel clusters 103A, 201A on the Pixel Cluster List 302 on the successive (new) frame. If matches are found, the pixel cluster 103A, 201A is appended to the tracking information for the matching candidate object and the candidate object is moved to the Tracking List 306. When a pixel cluster 103A, 201A is identified to a specific candidate object, such as a bat, it is removed from the Pixel Cluster List 302. The Identify New Potential Targets process 303 clears the unmatched candidate objects from the Potential List 304, creates new candidate objects for each pixel cluster 103A, 201A remaining in the Pixel Cluster List 302 and adds the candidate object to the Potential List 304.

In select embodiments of the present invention, all selected successive video frames are acted upon by all four processes 303, 35, 307, 309. The Pixel Cluster List 302 for a video frame is loaded and the Track Current Targets process 309 attempts to match pixel clusters 103A, 201A for all of the candidate objects on the Tracking List 306. The Identify New Targets 305 and Identify New Potential Targets 303 processes are run as they were for the first successive video frame. Next the process Identify Completed Tracks 307 identifies any candidate objects on the Tracking List 306 that have not had any recent track updates and, based on processing rules, discards them or moves them to the Target List 308.

In select embodiments of the present invention, the first step in processing a video frame is to locate the new positions of all currently tracked candidate objects. For each currently tracked candidate object, a predicted location and a search radius are computed. The predicted location in the image plane [X, Y] is the position the candidate object would be without any deviation to the motion vector. The search radius accounts for any deviations in the motion vector, V, of each track.

In select embodiments of the present invention, the predicted location is computed using current location and a computed motion vector, V (pixels/frame). V is calculated by subtracting the last two known candidate object positions, [X, Y]$_f$ and [X, Y]$_{f-n}$ (where f represents the current frame number and f–n represents the frame number in which that same candidate was previously detected). Because a candidate object may be undetected for several successive frames, the predicted location needs to be adjusted for the number of frames, n, since the previous detection(s) and the number of frames, m, since the most recent detection. If no frames have been skipped then both m and n will be one. The motion vector components may be calculated from:

$$V_x = \left(\frac{X_f - X_{f-n}}{n}\right) * (m) \quad (3)$$

and $$V_y = \left(\frac{Y_f - Y_{f-n}}{n}\right) * (m) \quad (4)$$

In select embodiments of the present invention, the predicted location of the candidate object is computed by summing current coordinates and vector increments as follows:

$$X_{f+m} = X_f + V_x \quad (5)$$

and $$Y_{f+m} = Y_f + V_y \quad (6)$$

In select embodiments of the present invention, the search radius, α, is computed by multiplying the magnitude of the directional vector, V, by a user-specified constant, K. K is a maneuverability factor representing the ability of an object in motion, such as a bat, to change speed and direction. In select embodiments of the present invention, the default value of K is ⅔. The radius is set to the maximum of either the computed product or the minimum radius allowed, $α_{min}$. The minimum radius accounts for candidate objects in motion that are at the outer range limit of detection and are moving at a slow rate. In select embodiments of the present invention, the search radius is computed using:

$$α = \text{Max}(K * \sqrt{V_X^2 + V_Y^2}, α_{min}) \quad (7)$$

Using the predicted location, [X, Y]$_{f+m}$, and the tracking radius, α, the Tracking Algorithm traverses through the current frame's Pixel Cluster List 302 calculating the distance between the predicted location and the center location of the pixel cluster 103A, 201A. If the distance is within the search radius, α, the difference in the pixel counts of the two pixel clusters 103A, 201A is calculated for comparison. If multiple candidate objects in motion are found within the search radius, α, the one that is closest to the predicted location and closest in size is selected as the best fit. If a valid candidate pixel cluster 103A, 201A is found, that one is added to the tracking information on the candidate object in motion.

In select embodiments of the present invention, the second processing step is to locate any matches to item on the current Potential List 304. For each of the potential items on that list, the Tracking Algorithm searches through the list of pixel clusters 103A, 201A on the Pixel Cluster List 302 for the frame to locate a pixel cluster 103A, 201A that best matches the location and size of the potential candidate object in motion. The pixel cluster 103A, 201A representing the next location for the candidate object in motion should be within a search radius of δ. To compute δ, first compute the pixel solid angle, Ω (steradians), from the horizontal and vertical FOVs (hFOV and vFOV, in degrees) and the number of pixels within the field of view (hPixels and vPixels), by Eqn. (2).

The radius, δ, is an estimate of the maximum distance that the candidate object in motion is expected to travel based on its size, $N_P$, an estimated cross-sectional area, A (m$^2$), the video frame rate, F (Hz), an estimated maximum speed $S_m$ (m/s), and the pixel solid angle, Ω, represented by Eqn. (1).

In select embodiments of the present invention, using the location of the potential candidate object in motion, the Tracking Algorithm searches through the pixel clusters 103A, 201A on the Pixel Cluster List 302 of the frame, calculating the distance between the locations and the difference in the pixel counts. If multiple candidates are found within the search radius, δ, the candidate that is closest to the predicted location and closest in size is selected as the best fit. If a pixel cluster 103A, 201A is found within the search radius, δ, the new pixel cluster 103A, 201A is added to the tracking information for the potential candidate object in motion and that one is moved to the Tracking List 306.

In select embodiments of the present invention, transferring the remaining pixel clusters 103A, 201A to the Potential List 304 is the third step in the process 300. The pixel clusters 103A, 201A that are currently on the Potential List 304 are removed before the new pixel clusters 103A, 201A are added. Potential candidate objects in motion are viewed only for a single frame cycle. If a match for the pixel cluster 103A, 201A is not found, it remains unclassified. To minimize false tracks the pixel cluster 103A, 201A must exceed a user-specified minimum size. This filters out the random noise (e.g., 1-2 pixels/cluster) that may occur in a video frame. In select embodiments of the present invention, pixel clusters 103A, 201A that exceed the size requirement are added to the new Potential List 304.

In select embodiments of the present invention, the fourth and final step in processing a video frame is to identify candidate objects in motion on the Tracking List 306 that have not had any recent track updates. The user specifies the number of consecutive frames that may elapse without a track update. When this number of frames is reached a track is considered lost. When this occurs, the track will be removed from the Tracking List 306 and either discarded or added to the Target List 308. A user also specifies a minimum track length that must be reached for a candidate object in motion to be accepted. When the minimum track length is reached, the candidate object in motion is moved from the Tracking List 306 to the Target List 308. If the length is not obtained, that candidate object in motion is discarded. Applying a minimum track length reduces the number of false tracks.

Once a "good" track is established, in select embodiments of the present invention there are two ways it may be added to the Target List 308. The first is as a continuation of a previous track and the second is as a new track. The track is classified a continuation if it had been obscured by a tree or other obstacle in the FOV of the imager (camera). To verify this, terminal points of existing candidate objects in motion in a preceding frame are checked to see if they meet user-specified criteria for concatenation. In select embodiments of the present invention, three criteria must be met to concatenate two tracks: a) the terminal point of a candidate track cannot terminate at the edge of the preceding frame; b) the first time of appearance in the subsequent frame of the "new" track must occur within a reasonable time after that of the terminal point of the candidate track; and c) the [X, Y] coordinates of the new track must lie within a reasonable distance and angle, β, from the terminal point of the existing candidate track. If any of the criteria are not met, the "new" track is added as a new item on the Target List 308.

In select embodiments of the present invention, once all the frames in the video sequence have been processed through the Tracking Algorithm, a final verification check is performed. A user specifies a minimum travel distance, d, that a candidate object in motion must traverse to be considered valid. A smallest enclosing rectangle is computed for the track of the candidate object in motion. The hypotenuse of the rectangle is computed and compared with the minimum travel distance, d. This final verification filters out noise that may occur when a non-candidate object moves in a localized area, such as treetops moving in the wind.

Testing select embodiments of the present invention employed an Indigo TVS-620 thermal imager incorporating an un-cooled microbolometer focal plane array detector (320×236 pixels) operating in the 800-1400 nanometer (nm) waveband. The field of view of the lens is 26.2° horizontal by 19.3° vertical. Tests recorded 8-bit un-calibrated thermal imagery at 30 frames/sec on 4 mm digital videotapes (DV mini-cassettes). Depending on range to the camera, a candidate object in motion, such as a bat, may be represented by as few as one or two pixels to over a hundred pixels. In testing select embodiments of the present invention, thermographic video frames were transferred to a computer via a video capture process having a frame resolution of 360×240 pixels. In select embodiments of the present invention, any imagery capable of being recorded onto the same digital media could be used, i.e., embodiments of the present invention do not require using a camera system identical to the above test camera.

Figure 4:
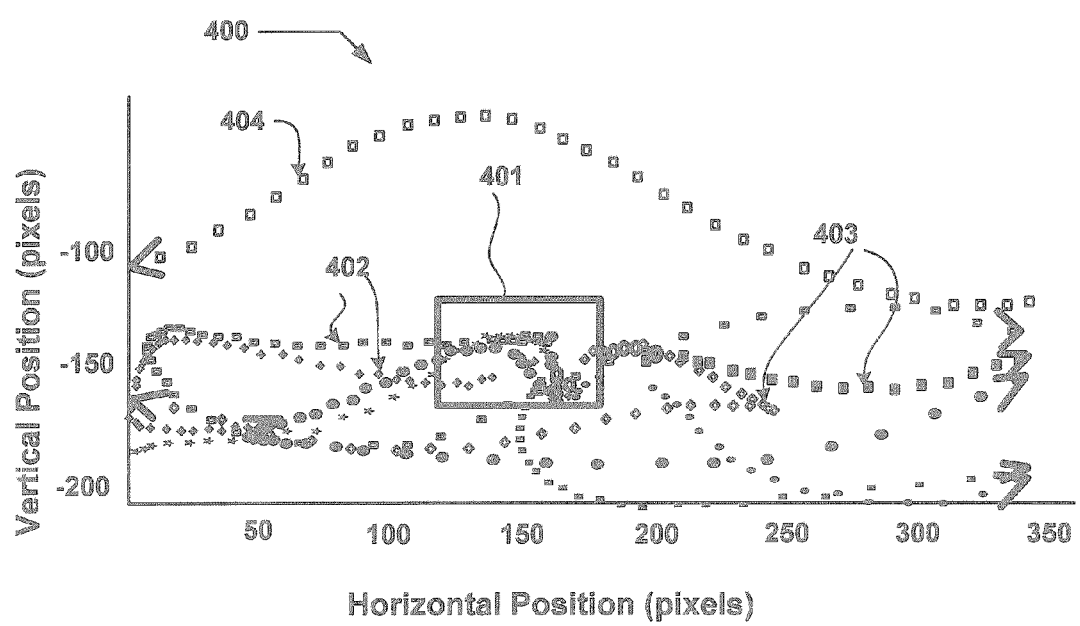
FIG. 4 illustrates a one-minute segment of tracking of individual bats as may be obtained by using select embodiments of the present invention.

In select embodiments of the present invention, post-processing of the track data allows a user to enumerate the number of candidate objects in motion, such as bats emerging from or returning to a roost. Refer to FIG. 4 illustrating a one-minute segment 400 of tracking of bats that are emerging from the opening at a typical roost. The rectangle 401 in the center of the graph is positioned around the opening of the roost. The area inside the rectangle 401 defines the Inside and the remaining area outside the rectangle defines the Outside. The rectangle 401 is used to segment the image space into inside and outside regions. In select embodiments of the present invention enumeration entails applying the following logic: a) candidate objects in motion (identified to individual tracks) that originate on the inside (as represented by the tracks 402, 403) and terminate on the outside are classified as emergent and the emergence tally is incremented by one; b) candidate objects in motion that originate on the outside and terminate on the inside are classified as returns and the return tally is incremented by one; c) all other candidate objects in motion (as represented by the track 404) are considered unclassified and do n ot contribute to the count. Further, the return tally may be subtracted from the emergence tally to estimate net emergence. To estimate general activity levels, the total number of candidate objects in motion, such as bats tracked per minute may be computed.

The abstract of the disclosure is provided to comply with the rules requiring an abstract that will allow a searcher to quickly ascertain the subject matter of the technical disclosure of any patent issued from this disclosure. (37 CFR §1.72 (b)). Any advantages and benefits described may not apply to all embodiments of the invention.

While the invention has been described in terms of some of its embodiments, those skilled in the art will recognize that the invention can be practiced with modifications within the spirit and scope of the appended claims. For example, while flying bats present a particularly challenging tracking environment, select embodiments of the present invention are generic in nature and may be applied to numerous types of tracking and enumeration applications. The type of imagery may be any of visible, IR or the UV light spectra, radio frequency, and even audio frequencies in sonar applications. Select embodiments of the present invention require but a single band that results in an image that may be processed as video. For example, select embodiments of the present invention may employ algorithms using visible light imagery to track vehicles at an intersection and to track lighted drogues progressing through a hydraulics model, and the like. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A method for tracking bats, comprising:
   a) employing at least one specially configured computer having computer readable storage media at least some of which contains specialized software implementing at least one algorithm;
   b) capturing video images of said bats by employing at least one digital imaging device, said at least one digital imaging device in operable communication with said at least one specially configured computer;
   c) employing at least some said specialized software implementing a first said at least one algorithm to create at least one synthetic adaptive temporal background within the field of view (FOV) of said at least one digital imaging device, said synthetic adaptive temporal background at least removing clutter,
   wherein synthetic target-free background images are generated as said at least one synthetic temporal background at a time interval and number of sequential source images specified by a user, and
   wherein the value for each pixel in said synthetic target-free background is determined by taking the mode of the histogram of values of said pixels for each location within a said video image;

d) collecting on at least said computer readable storage media at least said video images of said bats, said video images made available as pixels arranged in video frames;

wherein at least said video images of said bats are sent to said computer for processing using at least some of said specialized software;

e) for each said bat imaged by said at least one digital imaging device, differencing said pixels in said video frames sequentially by subtracting a current said synthetic temporal background to yield differenced said pixels as a differenced image;

f) taking the absolute value of each resultant said differenced image, wherein said absolute value is taken to eliminate the effects of polarity;

g) thresholding, to a user-specified threshold, those of said differenced pixels at the tail end of the distribution of said differenced pixels, wherein the location and value of said differenced pixels are saved to a detected pixel report for subsequent processing, and wherein said imaged bats are each identifiable as an individual said pixel cluster of said pixels in said video frame of thresholded differenced pixels, and wherein a track of a said imaged bat is established if two said individual pixel clusters representing an individual said bat exhibit similar size in two successive video frames of said differenced thresholded pixels;

h) applying a standard "region growing" technique to find discrete contiguous said pixel clusters to be associated with each candidate said bat, wherein applying said "region growing" algorithm establishes a cluster of contiguous single-polarity pixels that identifies an individual said bat, and wherein the center location of said pixel cluster, number of said pixels, and boundary dimensions of said pixel cluster are saved for subsequent processing, and wherein said center location [X, Y] of each said pixel cluster is determined by taking an average of all locations of said pixels within said pixel cluster weighted by a respective absolute difference value;

i) establishing said two pixel clusters of a similar size in at least two successive video frames as location pairs; and j) updating and labeling each said location pair as a motion vector in each subsequent said differenced thresholded video frame, wherein said updating is used to predict a next position of each said imaged bat; and k) iterating steps d) through j) said video frame-by-said video frame for each said FOV and respective synthetic temporal background to generate an output of individual said tracks of each said imaged bat represented in said video frames, wherein said method enables simultaneous tracking of multiple bats, and wherein said bats may have a thermal signature in a range that is approximately equal to the range of the thermal signature of said stationary background in the FOV of said digital imaging device, and wherein behavior of said multiple bats may be chaotic.

2. The method of claim 1 further enumerating a list of said tracks as either on an emergent list or on a return list, comprising:

specifying a polygon within said FOV;

classifying each said track that originates on the inside of said polygon and terminates on the outside of said polygon as an emergent track; and incrementing by one said emergent list for each said track classified as an emergent track; and classifying each said track that originates on the outside of said polygon and terminates on the inside of said polygon as a return track; and incrementing by one said return list for each said track classified as a return track; and labeling any objects remaining as unclassified.

3. The method of claim 2, further comprising differencing said emergent list and said return list to yield a net flow count.

4. The method of claim 1, said tracking algorithm further comprising:

establishing four lists, said lists comprising:
a Pixel Cluster List,
wherein said Pixel Cluster List is loaded for each selected said video frame;
a Potential List;
a Tracking List; and
a Target List,
wherein when said pixel cluster is identified to a specific candidate said bat, said pixel cluster is removed from said Pixel Cluster List;

implementing four processes, said processes comprising:
Tracking Current Targets,
wherein said Tracking Current Targets process predicts a search location and radius using a computed motion vector to select a candidate said bat in the current video frame that best fits user-specified search criteria, and
wherein said Tracking Current Targets process matches said pixel clusters for all candidate bats on said Tracking List; and
Identifying New Targets,
wherein said Identifying New Targets process searches for new bats to track using a said search radius based on size;
Identifying New Potential Targets,
wherein said Identifying New Potential Targets process clears unmatched said bats from said Potential List, creates new candidate objects for each said pixel cluster remaining in said Pixel Cluster List and places all unmatched said bats and said candidate objects in said current video frame on a potential list for input into a next process for next said video frame and adds the candidate bats to said Potential List; and
Identifying Completed Tracks,
wherein said Identifying Completed Tracks process accepts an input from said Potential List, and
wherein said Identifying Completed Tracks process identifies any said bats on said Tracking List that have not had any recent track updates and, based on processing rules, discards said bats without recent track updates or moves said bats without recent track updates to said Target List,
wherein said tracking algorithm processes detected said bats across said video frames, producing a time and spatial history for each.

5. The method of claim 4, further computing a set of attributes associated with each said bat identified to a said pixel cluster, said attributes selected from the group consisting of frame number, time, clock time, number of said pixels in said pixel cluster, height and width (in pixels) of each said pixel cluster, and combinations thereof, wherein said set of attributes is passed forward to said tracking algorithm for each said identified pixel cluster in each said differenced video frame.

6. The method of claim 4, said processes further comprising:

calculating a motion vector for each said track by differencing a last two known positions of said bat, adjusting said motion vector for the number of said video frames, n, since a previous detection of said bat and the number of frames, m, since a most recent detection of said bat;

computing a search radius by multiplying the magnitude of said motion vector by a user-specified constant, K;

predicting a new position for each said current track by computing a predicted position, wherein said predicted position is computed to be where said current track would extend without any deviation in said motion vector associated therewith, and wherein said K is a maneuverability factor representing the ability of said candidate bat in motion to change speed and direction and is selected to accommodate deviations in said motion vector, and wherein said predicted position is computed using a current location and said computed motion vector, and wherein said predicted position is computed by summing current coordinates and vector increments, and wherein said radius is set to the maximum of either said computed product or a minimum allowed radius, and wherein said minimum radius accommodates said bats that are at the outer range limit of detection and are moving at a rate slower than expected for said bats;

using said predicted location and said tracking radius while cycling through said Pixel Cluster List of a current said video frame and calculating a distance between said predicted position and a center position of each said pixel cluster in said current video frame, wherein if said distance is within said computed search radius, a difference in pixel counts for each said bat in said current video frame is calculated for comparison, and wherein if multiple said bats, each identified as one of said pixel clusters, are found within said search radius, a said search radius that is closest to said predicted location and closest in size to an individual tracked said pixel cluster is selected as a best fit, and wherein if a valid candidate said pixel cluster is found, that said candidate pixel cluster is represented as a said bat and is added to tracking information on said bat; and locating any matches to said tracked bat on a current said Potential List, wherein for each potential item on said Potential List, a said at least one algorithm searches through said Pixel Cluster List for said current video frame to locate a said pixel cluster that best matches the location and size of said tracked bat, given that said pixel cluster representing the next location for said tracked bat is within a second radius of $\delta$, and wherein $\delta$ is an estimate of the maximum distance that said tracked bat is expected to travel based on its size, $N_P$, an estimated cross-sectional area, $A$ (m$^2$), a video frame rate, $F$ (Hz), an estimated maximum speed $S_m$ (m/s), and the solid angle, $\Omega$ (steradians), of said pixel represented by:

$$\delta = \frac{\tan^{-1}\left(\frac{\frac{1}{F}*S_m}{\sqrt{\frac{A}{2*N_P*\Omega}}}\right)}{\sqrt{\Omega}},$$

and wherein, using said location of a potential candidate bat said at least one algorithm searches through said pixel clusters on said Pixel Cluster List of said current video frame, calculating distance between locations and the difference in pixel counts, such that if multiple said candidate bats are found within said search radius, $\delta$, said candidate bat that is closest to said predicted location and closest in size to said pixel cluster from a selected preceding said video frame is selected as a best fit, and wherein if said pixel cluster is found within said search radius, $\delta$, a new pixel cluster is added to the tracking information for a potential said bat and moved to said Tracking List;

transferring the remaining said pixel clusters to said Potential List and removing said pixel clusters that are currently on said Potential List before said remaining pixel clusters are added, wherein potential said bats are viewed only for a single video frame cycle, and wherein if a match for a said pixel cluster is not found, said un-matched pixel cluster remains unclassified, and wherein to minimize false said tracks, said pixel cluster must exceed a user-specified minimum size;

adding said pixel clusters that exceed said user-specified minimum size to said Potential List for said current video frame;

identifying said objects on said Tracking List that have not had any recent track updates, said user specifying a number of consecutive said video frames that may elapse without an update to said track such that when said specified number of consecutive said video frames is reached a said track is considered lost;

removing said lost track from said Tracking List and either discarding said lost track or adding said lost track to said Target List;

specifying a minimum length of said track that must be reached for said bat to be accepted for said Target List;

adding said track to said Target List once said track is accepted either as a continuation of a previous said track or as a new said track;

classifying said accepted track as said continuation of a previous track if said track had been obscured by a configuration in said FOV of said at least one digital imaging device;

establishing user-specified criteria for concatenation;

verifying said classification as said continuation of a previous track by insuring terminal points of existing said tracked bats in a preceding said video frame meet said user-specified criteria for concatenation;

performing a final verification check after all said video frames in a said video sequence have been processed through said at least one algorithm; and specifying a minimum travel distance, d, that each said tracked bat must traverse to be considered valid;

computing a smallest enclosing rectangle for said track of said bat;

computing the hypotenuse of said smallest enclosing rectangle, and comparing said hypotenuse with said minimum travel distance, d.

7. The method of claim 6, computing said pixel solid angle, $\Omega$, from horizontal and vertical FOVs ($h_{FOV}$ and $v_{FOV}$, in degrees) and number of said pixels within said FOV ($h_{Pixels}$ and $v_{pixels}$), by implementing one said at least one algorithm as:

$$\Omega = \left(\frac{hFOV * \frac{\pi}{180}}{hPixels}\right) * \left(\frac{vFOV * \frac{\pi}{180}}{vPixels}\right).$$

8. The method of claim 5, said criteria at least comprising:
the terminal point of a said track cannot terminate at the edge of the preceding said video frame;
the first time of appearance in a successive video frame of a new said track must occur within a reasonable time after that of said terminal point of a said track; and
coordinates of said new track must lie within a user-specified distance and angle, β, from said terminal point of a said track,
wherein if any of said criteria are not met, said track is added as a said new track on said Target List.

9. The method of claim 1, further comprising fixing in position and orientation as said at least one digital video imaging device at least one digital thermal videographic camera, orienting said digital thermal videographic camera such that said candidate bats move in a direction approximately perpendicular to the line of sight of said digital thermal videographic camera, wherein a combination of factors, said factors to include at least velocity of said candidate object, camera FOV, distance to said candidate object, and frame rate, that determines for how many video frames each said candidate bat is within said FOV of said camera permits imaging of a said candidate bat for at least six consecutive frames.

10. A method employing at least a specially configured computer in operable communication with at least one digital imaging device for capturing images of objects in motion, said images processed as video frames, said method enabling simultaneous tracking of multiple said objects in motion, said objects in motion having at least one characteristic of their signature in a range that is, at some times, approximately equal to the range of said characteristic in the signature of a background behind said objects in motion, comprising:
  a) providing at least some specialized software at least some of which implements at least one algorithm on computer readable storage media in operable communication with said specially configured computer;
  b) employing at least some said specialized software implementing a first said at least one algorithm to create at least one synthetic adaptive temporal background within the field of view (FOV) of each said at least one digital imaging device, said synthetic adaptive temporal background at least removing clutter,
  wherein synthetic target-free background images are generated as said at least one synthetic temporal background at a time interval and number of sequential source images specified by a user, and
  wherein the value for each pixel in said synthetic target-free background is determined by taking the mode of the histogram of values of said pixels for each location within a said video image;
  c) collecting on at least said computer readable storage media at least said video images of said objects in motion, said video images made available as pixels and pixel clusters arranged in video frames,
  wherein at least said video images of said objects are sent to said specially configured computer for processing, said processing employing at least some of said specialized software;
  d) for each said object in motion imaged by said at least one digital imaging device, differencing said pixels in said video frames sequentially by subtracting a current said synthetic temporal background to yield differenced said pixels as a differenced image;
  e) taking the absolute value of each resultant said differenced image,
  wherein said absolute value is taken to eliminate the effects of polarity;
  f) thresholding, to a user-specified threshold, those of said differenced pixels at the tail end of the distribution of said differenced pixels,
  wherein the location and value of said differenced pixels are saved to a detected pixel report for subsequent processing, and
  wherein said imaged objects in motion are each identifiable as an individual said pixel cluster of said pixels in said video frame of thresholded differenced pixels, and
  wherein a track of a said imaged object in motion is established if two said individual pixel clusters representing an individual said object in motion exhibit similar size in two successive video frames of said differenced thresholded pixels;
  g) applying a standard "region growing" technique to find discrete contiguous said pixel clusters to be associated with each candidate said object in motion,
  wherein applying said "region growing" algorithm establishes a cluster of contiguous single-polarity pixels that identifies an individual said object in motion, and
  wherein the center location of said pixel cluster, number of said pixels, and boundary dimensions of said pixel cluster are saved for subsequent processing, and
  wherein said center location [X, Y] of each said pixel cluster is determined by taking an average of all locations of said pixels within said pixel cluster weighted by a respective absolute difference value;
  h) establishing said two pixel clusters of a similar size in at least two successive video frames as location pairs; and
  i) updating and labeling each said location pair as a motion vector in each subsequent said differenced thresholded video frame,
  wherein said updating is used to predict a next position of each said object in motion; and
  j) iterating steps c) through i) said video frame-by-said video frame for each said FOV and respective synthetic temporal background to generate an output of individual said tracks of each said object in motion represented in said video frames,
  wherein said method enables simultaneous tracking of multiple objects in motion, and
  wherein said objects in motion may have a thermal signature in a range that is approximately equal to the range of the thermal signature of said stationary background in the FOV of each said digital imaging device, and
  wherein behavior of said objects in motion may be chaotic.

11. The method of claim 10, further enumerating said tracks as either on an emergent track list or on a return track list, comprising:
specifying a polygon within each said FOV;

classifying each said track that originates on the inside of each said polygon and terminates on the outside of each said polygon as an emergent track; and incrementing by one said emergent list for each said track classified as an emergent track; and classifying each said track that originates on the outside of said polygon and terminates on the inside of said polygon as a return track; and incrementing by one said return list for each said track classified as return track; and labeling any said objects remaining as unclassified.

12. The method of claim 11, further comprising differencing said emergent list and said return list to yield a net flow count.

13. The method of claim 10, said tracking algorithm further comprising:

establishing four lists, said lists comprising:
a Pixel Cluster List,
wherein said Pixel Cluster List is loaded for each selected said video frame;
a Potential List,
a Tracking List, and
a Target List,
wherein when said pixel cluster is identified to a specific candidate said object in motion, said pixel cluster is removed from said Pixel Cluster List; and implementing four processes, said processes comprising:
Tracking Current Targets,
wherein said Tracking Current Targets predicts a search location and radius using a computed motion vector to select a candidate said object in motion in the current video frame that best fits user-specified search criteria, and
wherein said Tracking Current Targets process matches said pixel clusters for all said candidate objects in motion on said Tracking List; and
Identifying New Targets,
wherein said Identifying New Targets process searches for new said objects in motion to track using a said search radius based on size;
Identifying New Potential Targets,
wherein said Identifying New Potential Targets process clears unmatched said objects in motion from said Potential List, creates new said candidate objects in motion for each said pixel cluster remaining in said Pixel Cluster List and places all unmatched said objects in motion in said current video frame on a potential list for input into a next process for next said video frame, and adds the candidate bats to said Potential List; and
Identifying Completed Tracks,
wherein said Identifying Completed Tracks process accepts an input from said Potential List, and
wherein said Identifying Completed Tracks process identifies any said objects in motion on said Tracking List that have not had any recent track updates and, based on processing rules, discards said objects in motion without recent track updates or moves said objects in motion without recent track updates to said Target List,
wherein said tracking algorithm processes detected said objects in motion across said video frames, producing a time and spatial history for each.

14. The method of claim 13, further computing attributes associated with each said object in motion identified to a said pixel cluster, said attributes selected from the group consisting of frame number, time, clock time, number of said pixels in said pixel cluster, height and width (in pixels) of each said pixel cluster, and combinations thereof, wherein said set of attributes is passed forward to said tracking algorithm for each said identified pixel cluster in each said differenced video frame.

15. The method of claim 13, said processes further comprising:

calculating a motion vector for each said track by differencing a last two known positions of said object in motion, adjusting said motion vector for the number of said video frames, n, since a previous detection of said object in motion and the number of frames, m, since a most recent detection of said object in motion;

computing a search radius by multiplying the magnitude of said motion vector by a user-specified constant, K;

predicting a new position for each said current track by computing a predicted position, wherein said predicted position is computed to be where said current track would extend without any deviation in said motion vector associated therewith, and wherein said K is a maneuverability factor representing the ability of said candidate object in motion to change speed and direction and is selected to accommodate deviations in said motion vector, and wherein said predicted position is computed using a current location and said computed motion vector, and wherein said predicted position is computed by summing current coordinates and vector increments, and wherein said radius is set to the maximum of either said computed product or a minimum allowed radius, and wherein said minimum allowed radius accommodates said objects in motion that are at the outer range limit of detection and are moving at a rate slower than expected for said objects;

using said predicted location, and said tracking radius while cycling through said Pixel Cluster List of a current said video frame and calculating a distance between said predicted position and a center position of each said pixel cluster in said current video frame, wherein if said distance is within said computed search radius, a difference in pixel counts for each said object in motion in said current video frame is calculated for comparison, and wherein if multiple said objects in motion, each identified as one of said pixel clusters, are found within said search radius, a said search radius that is closest to said predicted location and closest in size to an individual tracked said pixel cluster is selected as a best fit, and wherein if a valid candidate said pixel cluster is found, that said candidate pixel cluster is represented as a said object in motion and is added to tracking information on said object in motion; and locating any matches to said tracked object on a current said Potential List, wherein for each potential item on said Potential List, at least one said algorithm searches through said Pixel Cluster List for said current video frame to locate a said pixel cluster that best matches the location and size of said tracked object in motion, given that said pixel cluster representing the next location for said tracked object in motion is within a second radius of $\delta$, and wherein $\delta$ is an estimate of the maximum distance that said tracked object in motion is expected to travel based on its size, $N_P$, an estimated cross-sectional area, A (m$^2$), a video frame rate, F (Hz), an estimated maximum speed $S_m$ (m/s), and the solid angle, $\Omega$ (steradians), of said pixel represented by:

$$\delta = \frac{\tan^{-1}\left(\frac{\frac{1}{F} * S_m}{\sqrt{\frac{A}{2 * N_P * \Omega}}}\right)}{\sqrt{\Omega}},$$

and
- wherein, using said location of a potential candidate object in motion said algorithm searches through said pixel clusters on said Pixel Cluster List of said current video frame, calculating distance between locations and the difference in pixel counts, such that if multiple said candidate objects in motion are found within said search radius, δ, said candidate object in motion that is closest to said predicted location and closest in size to said pixel cluster from selected preceding said video frame is selected as a best fit, and
- wherein if said pixel cluster is found within said search radius, δ, a new pixel cluster is added to the tracking information for a potential said object in motion and moved to said Tracking List;
- transferring the remaining said pixel clusters to said Potential List and removing said pixel clusters that are currently on said Potential List before said remaining pixel clusters are added,
- wherein potential said objects in motion are viewed only for a single video frame cycle, and
- wherein if a match for a said pixel cluster is not found, said un-matched pixel cluster remains unclassified, and
- wherein to minimize false said tracks, said pixel cluster must exceed a user-specified minimum size;
- adding said pixel clusters that exceed said user-specified minimum size to said Potential List for said current video frame;
- identifying said objects in motion on said Tracking List that have not had any recent track updates, said user specifying a number of consecutive said video frames that may elapse without an update to said track such that when said specified number of consecutive said video frames is reached a said track is considered lost;
- removing said lost track from said Tracking List and either discarding said lost track or adding said lost track to said Target List;
- specifying a minimum length of said track that must be reached for said object in motion to be accepted for said Target List;
- adding said track to said Target List once said track is accepted either as a continuation of a previous said track or as a new said track;
- classifying said accepted track as said continuation of a previous track if said track had been obscured by a configuration in said FOV of said at least one digital imaging device;
- establishing user-specified criteria for concatenation;
- verifying said classification as said continuation of a previous track by insuring terminal points of existing said tracked objects in a preceding said video frame meet said user-specified criteria for concatenation;
- performing a final verification check after all said video frames in a said video sequence have been processed through said at least one algorithm;
- specifying a minimum travel distance, d, that each said tracked object in motion must traverse to be considered valid;
- computing a smallest enclosing rectangle for said track of said object in motion;
- computing the hypotenuse of said smallest enclosing rectangle, and
- comparing said hypotenuse with said minimum travel distance, d.

16. The method of claim 15, computing said pixel solid angle, Ω, from horizontal and vertical FOVs ($h_{FOV}$ and $v_{FOV}$, in degrees) and number of said pixels within said FOV ($h_{Pixels}$ and $v_{pixels}$), by implementing one said at least one algorithm as:

$$\Omega = \left(\frac{hFOV * \frac{\pi}{180}}{hPixels}\right) * \left(\frac{vFOV * \frac{\pi}{180}}{vPixels}\right).$$

17. The method of claim 15, said criteria at least comprising:
- the terminal point of a said track cannot terminate at the edge of the preceding said video frame;
- the first time of appearance in a successive video frame of a new said track must occur within a reasonable time after that of said terminal point of a said track; and
- coordinates of said new track must lie within a user-specified distance and angle, β, from said terminal point of a said track,
- wherein if any of said criteria are not met, said track is added as a said new track on said Target List.

18. The method of claim 13 creating said video frames from said at least one digital imaging device operating in the frequency band selected from the group consisting of infrared light, ultraviolet light, visible light, radio frequencies (RF), acoustic, and combinations thereof.

19. The method of claim 10 further comprising fixing in position and orientation as said at least one digital video imaging device at least one digital thermal videographic camera, orienting said digital thermal videographic camera such that candidate said objects in motion move in a direction approximately perpendicular to the line of sight of said digital thermal videographic camera,
- wherein a combination of factors, said factors to include at least velocity of said candidate object, camera FOV, distance to said candidate object, and frame rate, that determines for how many video frames each said candidate object is within said FOV of said camera permits imaging of a said candidate object in motion for at least six consecutive frames.

20. A system enabling simultaneous tracking of multiple objects in motion, candidate said objects in motion having at least one characteristic of their signature in a range that is approximately equal to the range of said characteristic in the signature of an established temporal background behind said objects in motion, comprising:
- at least one tripod;
- computer readable memory storage media, at least some of said computer readable memory storage media containing at least specialized software implementing at least one specially adapted algorithm;
- a specially configured computer in operable communication with said computer readable memory storage media;
- at least one digital imaging device, each said at least one imaging device in operable communication with one said at least one tripod, said at least one digital imaging device for capturing images of said multiple objects in motion that may be processed as video frames, said at least one digital imaging device in operable communication with said at least one specially configured computer, wherein said images are collected on at least some of said computer readable memory storage media, said images made available as pixels that may be arranged as pixel clusters in said video frames, and wherein said specially configured computer processes said captured images by employing at least one said algorithm, and wherein a first said at least one algorithm is applied so that for each said candidate object in motion, said pixels are differenced in said video frames sequentially by subtracting an adaptive temporal background, said subtracting at least removing clutter from said differenced frame, a second said at least one algorithm further enabling thresholding to remove those of said pixels at the tail ends of the distribution of said differenced pixels, resulting in said candidate objects in motion appearing as the only pixel clusters in said thresholded differenced video frame, and further establishing a track of one said candidate object in motion if two said pixel clusters exhibit similar size in a successive frame processed after said initial differenced thresholded video frame, and wherein said two pixel clusters of a similar size are then referred to as location pairs, and wherein said location pairs define a motion vector that is updated in each subsequent said differenced thresholded video frame to predict a next position of said candidate object in motion, and wherein each said at least one algorithm is iterated for successive said video frames to generate an output of at least individual said tracks of each said candidate object in motion that is represented in said differenced thresholded video frames, wherein each said candidate object in motion identified to an individual track that originates on the inside of a said pre-specified polygon and terminates on the outside of said polygon is classified as an emergent track, and wherein an emergence tally is incremented by one for each said candidate object in motion identified thereby, and wherein each said candidate object in motion that originates on the outside of said polygon and terminates on the inside of said polygon is classified as return track, and wherein a return tally is incremented by one for each said candidate object in motion identified thereby, and wherein all other said candidate objects in motion are considered unclassified.

* * * * *